United States Patent [19]

Tse

[11] Patent Number: 5,242,980
[45] Date of Patent: Sep. 7, 1993

[54] ETHYLENE-UNSATURATED ALCOHOL OR ACID COPOLYMER AND EPOXY CROSSLINKER

[75] Inventor: Mun F. Tse, Seabrook, Tex.

[73] Assignee: Exxon Chemical Patents Inc., Linden, N.J.

[21] Appl. No.: 970,533

[22] Filed: Nov. 2, 1992

Related U.S. Application Data

[60] Continuation-in-part of Ser. No. 841,152, Feb. 25, 1992, abandoned, which is a division of Ser. No. 475,596, Feb. 6, 1990, Pat. No. 5,095,046.

[51] Int. Cl.$^5$ .............. C08L 23/08; C08L 63/02; C08L 63/04
[52] U.S. Cl. .................... 525/114; 525/119; 523/206
[58] Field of Search .......................... 525/114

[56] References Cited

U.S. PATENT DOCUMENTS

| | | | |
|---|---|---|---|
| Re. 31,310 | 7/1983 | Najvar | 525/531 |
| 2,447,367 | 8/1948 | Rust et al. | 268/27 |
| 3,892,819 | 7/1975 | Najvar | 260/836 |
| 3,905,931 | 9/1975 | Ziegert | 260/29.6 |
| 3,912,773 | 10/1975 | Havriliak | 260/42.28 |
| 3,928,419 | 12/1975 | Light | 260/473 |
| 4,021,504 | 5/1977 | Conrad et al. | 260/836 |
| 4,067,926 | 1/1978 | Cadman et al. | 260/836 |
| 4,102,942 | 7/1978 | Smith et al. | 260/836 |
| 4,137,364 | 1/1979 | Ball, III et al. | 428/412 |
| 4,322,326 | 3/1982 | Pyle | 524/513 |
| 4,325,853 | 4/1982 | Acharya et al. | 524/272 |
| 4,332,713 | 6/1982 | Lehmann | 156/328 |
| 4,430,479 | 2/1984 | Merton et al. | 525/127 |
| 4,535,013 | 8/1985 | Kuhn | 427/389.9 |
| 4,602,056 | 7/1986 | Waniczek et al. | 524/272 |
| 4,612,349 | 9/1986 | Nicco et al. | 525/117 |
| 4,618,640 | 10/1986 | Tsuchida et al. | 524/272 |
| 4,622,357 | 11/1986 | Tsuchida et al. | 524/270 |
| 4,631,308 | 12/1986 | Graham et al. | 524/272 |
| 4,806,578 | 2/1989 | Kobayashi et al. | 523/402 |
| 4,829,124 | 5/1989 | Clark | 525/108 |
| 4,871,803 | 10/1989 | Zimmel et al. | 525/114 |
| 4,871,806 | 10/1989 | Shalati et al. | 525/114 |

FOREIGN PATENT DOCUMENTS

| | | | |
|---|---|---|---|
| 54-108852 | 8/1979 | Japan | 525/118 |
| 0798136 | 1/1981 | U.S.S.R. | 525/114 |

Primary Examiner—Robert E. Sellers
Attorney, Agent, or Firm—Catherine L. Bell; Douglas W. Miller

[57] ABSTRACT

A heat curable hot melt adhesive system is disclosed. The system uses an epoxy-crosslinking ethylene polymer component, a tackifier compatible therewith and an epoxy crosslinking agent having an epoxide functionality of at least 2. The ethylene polymer component may be either an ethylene copolymer of an $\alpha,\beta$-ethylenically unsaturated carboxylic acid, or an ethylene copolymer of an ethylenically unsaturated alcohol used in combination with a dicarboxylic acid anhydride. The dicarboxylic acid anhydride and/or the epoxy can be encapsulated to inhibit premature crosslinking. The formulation is applied to a substrate surface as a hot melt at a moderate temperature, and subsequently cured by heating the adhesive composition to a higher curing temperature.

7 Claims, 4 Drawing Sheets

ETHYLENE-UNSATURATED ALCOHOL OR ACID COPOLYMER AND EPOXY CROSSLINKER

This is a file wrapper continuation in part of application Ser. No. 841,152, filed Feb. 25, 1992, now abandoned, which is a division of application Ser. No. 475,596, filed Feb. 6, 1990, now U.S. Pat. No. 5,095,046.

FIELD OF THE INVENTION

The present invention relates to heat curable hot melt adhesive formulations, and more particularly to hot melt adhesive systems using epoxy crosslinking of functionalized ethylene polymers.

BACKGROUND OF THE INVENTION

Hot melt adhesives are generally a solid thermoplastic material which quickly melts upon heating and then sets to a firm bond on cooling. In contrast to most other types of adhesives which typically set by evaporation of a solvent or aqueous medium, hot melt adhesives are generally homogeneous mixtures. In the manufacture of hot melt adhesives, the thermoplastic material is typically compounded with one or more tackifiers, waxes, antioxidants and/or other stabilizing additives, and may be cooled for later use. The hot melt adhesive is typically heated in a reservoir from which it is supplied to a substrate by pumping or pressure extrusion through nozzles or slot dies. In contrast to the solvent-based or emulsion-type adhesives which require time for the evaporation of the solvent or aqueous medium, an almost instantaneous bonding can be obtained with hot melt adhesives.

A typical class of hot melt adhesive composition utilizes polyolefins as the base or carrier material. While polyolefins have experienced tremendous growth in their use as hot melts, their utilization has nevertheless been limited by several serious shortcomings. Polyolefin-based hot melts, for example, usually suffer from a lack of strong adhesion to non-porous metallic surfaces, such as aluminum, steel and the like. They also tend to be quite brittle unless suitably modified. All hot melts generally suffer from low bond strengths at elevated temperatures. When heated, even well below their melting points, they tend to soften and lose strength.

In the automotive industry in structural and semi-structural applications, the low temperature brittleness and high temperature softening difficulties of previous polyolefin hot melts have been approached by changing to more expensive epoxy adhesives to which are added elastomers to make rubber-toughened epoxies. However, the rubber-toughened epoxies have in turn suffered from a disadvantage in that low molecular weight materials remain in the epoxy material which are leached out into bathing solutions and these solutions must be changed out more frequently, often at great expense, because such low molecular weight constituents from the epoxy resins build up and accumulate therein. It would be advantageous if the less expensive olefin polymers could be obtained having similar properties to the epoxies, but without the presence of low molecular weight materials typically associated with the epoxy resins. As far as we are aware, however, no technology has heretofore provided such advantages.

From U.S. Pat. Nos. 3,892,819 and U.S. Pat. No. Re. 31,310, both to Najvar, it is known to react a polyepoxide with an unsaturated monocarboxylic acid monomer and a liquid carboxy terminated elastomer to form a terminally unsaturated vinyl ester resin which can be cured in admixture with a copolymerizable monomer by polymerization of the vinyl moieties in the presence of a peroxide curing agent. U.S. Pat No. 3,928,419 to Waters is similar.

Aqueous emulsions of a poly(ethyl acrylate), a copolymer of ethylene and acrylic acid, and an epoxy resin, each component being present within critical concentration limits, is described in U.S. Pat. No. 3,905,931 to Ziegert.

From U.S. Pat. No. 3,912,773 to Havriliak, it is known to use a casting resin system wherein a vinyl polymerization reaction product containing acid functionalities is cured via an acid-epoxide reaction with a diepoxide. The various reactants are prepared in two parts so that the acid monomer and the diepoxy are separated until just prior to use to avoid premature reaction.

From U.S. Pat. No. 4,021,504 to Conrad et al., and U.S. Pat. No. 4,067,926 to Cadman et al., it is known to use powder coating compositions containing mixtures of a copolymer of an olefinically unsaturated carboxylic acid and an ethylenically unsaturated ester, and a di- or multifunctional epoxide curing agent. The powder coating is prepared by mixing powders of the copolymer and the epoxide, or by melt blending the copolymer and the epoxide and forming the mixture into a powder. The powder is applied to the surface of an article to be coated therewith, and cured by thermosetting at elevated temperature.

From U.S. Pat. No. 4,102,942 to Smith et al., it is known to prepare a high solid composition comprising a blend of low molecular weight acrylic copolymers having pendant carboxyl groups and aliphatic polyepoxides.

From U.S. Pat. No. 4,612,349 to Nicco et al., it is known to use a crosslinking process wherein an ethylenemaleic anhydride-unsaturated carboxylic acid ester terpolymer is reacted with a polyepoxide added to the terpolymer just prior to application and which gradually crosslinks the terpolymer after being cooled.

U.S. Pat. No. 4,806,578 to Kobayashi et al. describes a highly absorptive resin produced by crosslinking a hydrophilic polymer having carboxylic or carboxylate groups with a polyglycidyl ether having 4 or more epoxy groups, in the presence of water.

From U.S. Pat. No. 4,332,713 to Lehmann, it is known to use a pasty thermosetting adhesive containing a liquid epoxide resin, a latent epoxide curing agent which is insoluble in the epoxide resin, and an insoluble thermoplast powder such as ethylene-acrylic acid-acrylate terpolymer.

In U.S. Pat. No. 4,829,124 to Clark, a thermoplastic elastomer is described which comprises a blend of a carboxylated butadiene-acrylonitrile elastomer and a partially neutralized ethylene-acrylic acid copolymer which has been dynamically crosslinked with a polyfunctional epoxy crosslinking agent.

From U.S. Pat. No. 2,447,367 to Rust et al., it is known to prepare polymeric rosin esters by heating an ester of a rosin and a polyhydric alcohol with a polymer containing carboxyl or carbalkoxy groups. Similar polymeric esters are known from U.S. Pat. No. 3,438,918 to Arlt, Jr. et al. to be used for building tack in ethylene-propylene terpolymer rubbers.

From U.S. Pat. No. 4,137,364 to Ball, III et al., it is known to prepare ethylene-vinyl acetate-vinyl alcohol terpolymers crosslinked with either a silane or a biscaprolactam.

From U.S. Pat. No. 4,430,479 to Merton et al., it is known to prepare a hot melt adhesive comprising a hydroxyl-containing ethylene copolymer and an isocyanate crosslinking agent.

Various art is available teaching hot melts prepared with ethylene and/or vinyl based polymers, such as, for example, U.S. Pat. Nos. 4,322,326 to Pile; U.S. Pat. No. 4,325,853 to Acharya et al.; U.S. Pat. No. 4,535,013 to Kuhn; U.S. Pat. No. 4,602,056 to Waniczek et al.; U.S. Pat. No. 4,618,640 to Tsuchida et al.; U.S. Pat. No. 4,622,357, also to Tsuchida et al.; and U.S. Pat. No. 4,631,308 to Graham et al.

SUMMARY OF THE INVENTION

The present invention utilizes the discovery that ethylene polymers having, or which are capable of being modified to have, carboxylic acid functionality can be blended with an epoxy crosslinking agent having an epoxide functionality of at least 2, and that this mixture can be applied as a hot melt without substantial crosslinking occurring between the ethylene polymer and the epoxy crosslinking agent at a moderate temperature, e.g., melt pot or hot melt reservoir temperatures. However, the mixture of the ethylene polymer and the epoxy crosslinking agent can be crosslinked by subjecting the mixture to a higher temperature, e.g. 180° C. for one-half hour, a curing condition commonly used in the automotive industry for rubberized epoxies. The crosslinked ethylene polymer of this invention has enhanced high temperature properties and yet the low temperature properties of the cured and uncured hot melt are very similar. In addition, no low molecular weight by-products are generated in the condensation reaction of the carboxylic acid groups and the epoxy groups. Therefore, one particular advantage of this adhesive system is the absence of impurities at the adhesive/substrate interface which can weaken adhesive joint strength. Another advantage of this adhesive system is that joint failure is generally in a cohesive failure mode, rather than an adhesive failure mode.

Accordingly, in one aspect, the present invention provides a heat curable hot melt adhesive formulation. The formulation comprises an intimate mixture of: (a) an ethylene polymer component which is heat curable by an epoxy; (b) optionally, a tackifier compatible therewith; and (c) an epoxy crosslinking agent having an epoxide functionality of at least 2. The polymer component, tackifier and crosslinking agent may form a stable molten mixture at a temperature of from about 60° C. to about 140° C., and the mixture may be crosslinkable without substantial formation of low molecular weight products by curing at a temperature of at least about 150° C. for a period of time of from about 10 minutes to about 2 hours or more. The formulation may also have enhanced properties by providing the ethylene polymer component as a bimodal blend of a low carboxylic acid content fraction, preferably having a low melt index, and a high carboxylic acid content fraction, preferably having a high melt index. The pot stability of the formulation may be enhanced by providing the epoxy crosslinking agent in a microencapsulated form.

In one preferred embodiment, the hot melt adhesive formulation comprises an intimate mixture of: (a) from 5 to 100 parts by weight of a copolymer of ethylene and an α,β-ethylenically unsaturated carboxylic acid in an amount of from about 1 to about 50 percent by weight of the copolymer, having a melt index of at least about 2 dg/min and a 190° C. Brookfield viscosity greater than about 100 cps; (b) from 95 to 0 parts by weight of a compatible tackifier wherein the parts by weight of the copolymer and the tackifier together total 100, the tackifier having an acid number of from about 0 to about 160; and (c) an epoxy crosslinking agent having an epoxide equivalent weight of from about 90 to about 6000, present in an amount to provide an equivalent ratio of epoxide groups to carboxylic acid groups in the copolymer of from about 0.1:1 to about 10:1. The epoxy crosslinking agent is preferably microencapsulated for pot stability.

The invention also provides a stable, heat curable hot melt adhesive formulation, comprising an intimate mixture of: (a) an ethylene copolymer having a 190° C. Brookfield viscosity of from about 100 cps to about 7000 cps, the copolymer comprising ethylene and from about 1 to about 50 percent by weight of a carboxylic acid functional comonomer; and (b) a polyfunctional epoxy crosslinking agent present in an amount to provide an equivalent ratio of epoxy groups to carboxylic acid groups of from about 0.1:1 to about 10:1, the crosslinking agent having an epoxide equivalent weight of from about 90 to about 6000. While the wettability of this hot melt adhesive formulation is generally sufficient to provide adequate bonding to a substrate surface, it has been discovered that the cure strength of the adhesive may be further enhanced by the presence of a compatible tackfier. In a preferred embodiment, the epoxy crosslinking agent is encapsulated and a catalyst is included in the formulation to improve the cure thereof.

In another aspect, the invention provides a curable hot melt adhesive formulation, comprising an intimate mixture of a hydroxyl functional ethylene polymer, an optional tackifier, a dicarboxylic acid anhydride, and an epoxy crosslinking agent having an epoxide functionality of at least about 2. The ethylene polymer may be a copolymer of ethylene and an unsaturated alcohol, for example, selected from the group consisting of vinyl alcohol and hydroxyalkyl acrylates and methacrylates, having a melt index of at least about 2 dg/min and a 190° C. Brookfield viscosity greater than about 100 cps. The tackifier may have an acid number of less than about 160. The dicarboxylic anhydride, used for conversion of the hydroxyl functionality to carboxylic acid functionality, may be present in an amount to provide an equivalent ratio of anhydride groups to hydroxyl groups in the ethylene polymer of from about 0.1:1 to about 10:1. The dicarboxylic acid anhydride may be microencapsulated to inhibit premature crosslinking. The epoxy crosslinking agent preferably has an epoxide equivalent weight of from about 90 to about 6000. The epoxy crosslinking agent may be present in an amount providing an equivalent ratio of the epoxide groups in the crosslinking agent to anhydride groups in the dicarboxylic anhydride of from about 0.1:1 to 10:1. The epoxy crosslinking agent may also be microencapsulated for pot stability.

The invention also provides a stable, heat curable hot melt adhesive formulation comprising an intimate mixture of: (a) an ethylene copolymer having a 190° C. Brookfield viscosity of from about 100 cps to about 7000 cps, the copolymer comprising ethylene and from about 1 to about 50 percent by weight of a hydroxyl functional comonomer; (b) a dicarboxylic acid anhydride for conversion of the hydroxyl functionality to carboxylic acid functionality in an amount to provide an equivalent ratio of anhydride groups to hydroxy groups in the copolymer of from about 0.1:1 to about 10:1; and (c) a polyfunctional epoxy crosslinking agent present in an amount to provide an equivalent ratio of epoxy groups to anhydride groups of from about 0.1:1 to 10:1, the crosslinking agent having an epoxide equivalent weight of from about 90 to about 6000. While the wettability of this hot melt adhesive formulation is generally sufficient to provide adequate bonding to a substrate surface, it has been discovered that the cure strength of the adhesive may be further enhanced by the presence of a compatible tackifier. In a preferred embodiment, the epoxy crosslinking agent and the anhydride are encapsulated and a catalyst is included in the formulation to improve the cure thereof.

In yet another aspect of the invention, there is provided a substrate having applied to at least a portion of a surface thereof, the uncured adhesive composition described above.

In a further aspect of the invention, there is provided a method for bonding an adhesive to a substrate surface. The method includes the steps of: (a) applying a molten hot melt adhesive to a first substrate surface, the adhesive comprising an intimate mixture of (i) an epoxy-crosslinkable ethylene polymer component, (ii) optionally, a tackifier compatible therewith, and (iii) an epoxy crosslinking agent having an epoxide functionality of at least about 2; (b) optionally placing a second substrate surface in adhesive contact with the hot melt adhesive opposite the first surface; and (c) curing the adhesive at an elevated temperature and for a period of time effective for the epoxy crosslinking agent to crosslink the ethylene polymer component. The adhesive may be applied to the substrate at a temperature of from about 60° C. to about 140° C., for example, and cured at a temperature of from about 150° C. to about 200° C. for a time period of from about 10 minutes to about 2 hours or more. Because of the epoxy crosslinking mechanism, the crosslinked ethylene polymer component can be essentially free of low molecular weight byproducts formed during the curing step.

DETAILED DESCRIPTION OF THE PREFERRED EMBODIMENTS

The hot melt adhesive formulation of the present invention has an ethylene polymer component having carboxylic acid functionality or being capable of modification to have carboxylic acid functionality. The ethylene polymer component may comprise a plurality of reactive species, e.g. a hydroxyl functional polymer and a dicarboxylic acid anhydride which react to provide an ethylene polymer with carboxylic acid functionality, or the ethylene polymer component may comprise a copolymer of ethylene and an $\alpha,\beta$-ethylenically unsaturated carboxylic acid. In this latter embodiment of the invention, the ethylene-carboxylic acid copolymers will have polymerized therein at least about 40 and preferably at least about 60 weight percent ethylene, with the balance of the copolymer being, for example, an $\alpha,\beta$-ethylenically unsaturated carboxylic acid, and optionally one or more termonomers polymerizable therewith such as, for example, olefins, vinyl monomers such as vinyl esters of carboxylic acids, and alkyl esters of $\alpha,\beta$-ethylenically unsaturated carboxylic acids, and the like.

The $\alpha,\beta$-ethylenically unsaturated carboxylic acid is preferably present in the copolymer in an amount of from about 1 to about 50 percent by weight of the copolymer, more preferably from about 5 to about 30 weight percent, and particularly from about 10 to about 20 weight percent of the copolymer. Specific representative examples of suitable $\alpha,\beta$-ethylenically unsaturated carboxylic acids include acrylic acid, methacrylic acid, ethacrylic acid, crotonic acid, vinyl acetic acid, angelic acid, maleic acid, fumaric acid and the like. Of these, acrylic acid and methacrylic acid are preferred.

The polymerizable vinyl termonomer preferably comprises up to about 20 percent by weight of the copolymer, more preferably up to about 10 percent by weight of the copolymer. Preferred polymerizable termonomers in the copolymer include methyl acrylate, ethyl acrylate, methyl methacrylate, ethyl methacrylate, vinyl acetate and the like. The vinyl termonomer generally serves to improve low temperature stiffness of the adhesive.

It is readily appreciated in the art that the melt viscosity of the ethylene copolymer is influenced primarily by molecular weight, termonomer content, and also by the acid content. The ethylene copolymer preferably has a melt index of at least about 2 dg/min, more preferably at least about 40 dg/min, and especially at least about 100 dg/min and a 190° C. Brookfield viscosity not less than about 100 cps. As used herein, melt index (MI) is determined according to ASTM D-1238, condition E (190° C./2.16 kg), unless otherwise stated. As used herein, Brookfield viscosity is determined according to ASTM D-3236, unless otherwise stated. The ethylene copolymer preferably has a 190° C. Brookfield viscosity of from about 100 to about 7000 cps, more preferably from about 100 to about 3000 cps.

We have found that superior properties of the cured adhesive are obtained when the ethylene copolymer has a bimodal carboxylic acid distribution such as is obtained by blending or mixing a first fraction of low carboxylic acid content and a second fraction of high carboxylic acid content. Preferably, the first, low-acid content portion contains from about 0.1 up to about 10 weight percent of the carboxylic acid, and has a melt index of from about 1 up to about 100 dg/min; and the second fraction has a relatively higher carboxylic acid content of from at least about 10 to about 50 percent by weight, and a relatively higher melt index of from at least about 100 to about 3000 dg/min. These are mixed in such proportions as to obtain an average carboxylic acid content and a resultant melt index which fall within the ranges stated above.

Particularly preferred ethylene copolymers include ethylene-acrylic acid copolymer, ethylene-methyl acrylate-acrylic acid terpolymer and ethylene-vinyl acetate-acrylic acid terpolymer. The ester-containing terpolymers are preferred in applications wherein reduced stiffness at low temperature is desired.

In the alternate embodiment, the ethylene polymer component of the hot melt adhesive formulation comprises a hydroxyl functional ethylene polymer, and a dicarboxylic acid anhydride is included with the formulation. As hydroxyl functional ethylene polymers, there may be mentioned copolymers of ethylene and vinyl alcohol, hydroxyalkyl acrylates, and/or hydroxyalkyl methacrylates, preferably containing the hydroxyl functional comonomer in an amount of from about 1 to about 50 percent by weight of the copolymer, more preferably from about 5 to about 30 weight percent, and particularly from about 10 to about 20 weight percent of the copolymer. These ethylene-alcohol copolymers may further include up to 20 percent by weight, preferably up to 10 percent by weight, of an optional additional polymerized vinyl termonomer, preferably alkyl esters of ethylenically unsaturated carboxylic acids or vinyl esters of carboxylic acids, such as, for example, vinyl acetate, methyl acrylate, methyl methacrylate and the like. These copolymers may be obtained by interpolymerizing a mixture of the monomers, or by partial hydrolysis of copolymers of ethylene and vinyl acetate. Exemplary of the preferred ethylene-alcohol copolymers are ethylene-vinyl acetate-vinyl alcohol terpolymer (EVAVOH), ethylene/2-hydroxy ethyl acrylate copolymer (EHEA), ethylene/2-hydroxyethyl methacrylate copolymer (EHEMA), ethylene/methyl acrylate/2-hydroxy ethyl methacrylate terpolymer (EMAHEMA), and the like.

In a preferred embodiment, the ethylene-alcohol copolymer has a bimodal hydroxyl group distribution such as is obtained by blending or mixing a first fraction of low hydroxyl group content and a second fraction of high hydroxyl group content. For example, the first, low-hydroxyl group content fraction may contain from about 0.1 up to about 10 weight percent of the hydroxyl functional monomer, and have a melt index of from about 1 up to about 100 dg/min; and the second fraction may have a relatively higher hydroxyl functional monomer content of from at least about 10 to about 50 percent by weight, and have a melt index of at least about 100 up to about 3000 dg/min. These fractions are mixed in such proportions as to obtain an average hydroxyl functional monomer content and a resultant melt index within the ranges stated above.

As dicarboxylic acid anhydrides used in the adhesive formulation with the ethylene-alcohol copolymers, there may be mentioned the commercially common phthalic anhydride, although other dicarboxylic anhydrides may be used such as, for example, maleic anhydride, pyromellitic dianhydride, dodecylsuccinic anhydride, 4-aminophthalic anhydride, and the like. The anhydride serves to convert the hydroxyl functionality of the ethylene polymer to carboxylic acid functionality for crosslinking by the epoxy crosslinking agent, and selection of the particular anhydride employed is not otherwise critical. The dicarboxylic anhydride is generally used in an amount to provide an equivalent ratio of anhydride groups to hydroxyl groups in the hydroxyl functional ethylene copolymer of from about 0.1:1 to about 10:1, more preferably from about 0.5:1 to about 2.5:1 and especially from about 0.9:1 to about 1.5:1. The dicarboxylic acid anhydride is preferably microencapsulated by a high-melting (e.g. in the range of 120° C. to about 140° C.) microcrystalline wax, a high-melting natural wax, a non-reactive polyolefin material, or the like. Microencapsulation is discussed below in connection with the epoxy crosslinking agent.

The second component of the hot melt adhesive formulation is an optional tackifier compatible with the ethylene copolymer present to promote wetting of the substrate and adhesion. A tackifier is generally used with higher molecular weight, higher viscosity polymers which do not usually adequately wet the substrate surface. However, when the melt viscosity of the ethylene polymer is sufficiently low, sufficient substrate wetting and adhesion can generally be obtained without a tackifier. Even so, when a tackifier is present with low molecular weight copolymers, better curing is surprisingly obtained, and a tackifier is, therefore, preferred.

Suitable tackifiers include, for example, rosin esters, polyterpenes, aromatic hydrocarbon resins, aliphatic hydrocarbon resins, mixed aliphatic/aromatic resins, hydrogenated cyclic resins, and the like. These tackifiers typically have a ring and ball softening point from about 25° C. to about 180° C., preferably from about 50° C. to about 135° C., and an acid number of from about 0 to about 160, preferably from about 0 to about 20. In general, the acid number of the tackifier component should be relatively low to avoid undesired reaction between the acid groups of the tackifier and the epoxy crosslinking agent. Such tackifiers are well known in the art and are available commercially. For example, rosin esters are available under the trade designations PENTALYN, SYLVATAC, ZONESTER, and the like; hydrogenated rosin esters are available under the trade designations FORAL, HERCOLYN, HYDROTAC, STAYBELITE ESTER, and the like; polyterpenes are available under the trade designations PICCOLYTE, ZONAREZ and the like; aromatic hydrocarbon resins are available under the trade designations ESCOREZ, CUMAR and the like; aliphatic hydrocarbon resins are available under the trade designations ESCOREZ, LX, PICCOTAC, RES D and the like; mixed aliphatic/aromatic hydrocarbon resins are available under the trade designations ESCOREZ, REGALITE, HERCULES AR, IMPREZ, NORSOLENE M, ARKON M, QUINTONE and the like; and hydrogenated cylic resins are available under the trade designations ESCOREZ, ARKON, CLEARON and the like. The tackifier(s) is(are) generally present in an amount effective to promote adhesion to the substrate used in the particular application. Where the parts by weight of the ethylene polymer component and the tackifier total 100, the tackifier constitutes from 0 to about 95 parts by weight, preferably from about 5 to about 95 parts by weight, more preferably from about 30 to about 70 parts by weight.

The epoxy crosslinking agent generally has a plurality of epoxy groups which crosslink the ethylene polymer component by reaction between the epoxy groups of the epoxy crosslinking agent and the acid groups of the ethylene polymer component. The polyfunctional epoxy crosslinking agent may have the general formula:

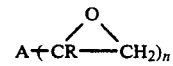

wherein A is a polyfunctional group of average valence of at least about 2, n is a number having an average of at least about 2, and R is a hydrocarbyl radical. A may be aliphatic or, preferably, aromatic. Aliphatic type epoxy crosslinking agents include the glycidyl ethers of polyhydroxy, polythio and polycarboxy aliphatic compounds, particularly polyglycidyl ethers of polyalcohols, such as, for example, diglycidyl ethers of α,ω-diols, including butanediol diglycidyl ether, hexanediol diglycidyl ether, paracyclohexyldimethanol diglycidyl ether, neopentyl glycol diglycidyl ether, triglycidyl ethers of triols, including trimethylolpropane triglycidyl ether and glycerol triglycidyl ether, and tetraglycidyl ethers of tetrols including pentaerythritol tetraglycidyl ether and the like. There may also be mentioned here epoxidized olefin compounds such as, for example, epoxidized soybean oil, epoxidized linseed oil, epoxidized cycloolefins and cyclic dienes, cycloaliphatic epoxides such as vinyl cyclohexene dioxide and bis(3,4-epoxy-6-methylcyclohexyl methyl) adipate, and the like.

As the preferred aromatic type epoxy crosslinking agents, there may be mentioned the glycidyl ethers, thioethers, and esters of aromatic compounds having an average of from about 2 to about 4 hydroxy, thio, carboxy, or mixture of such groups per molecule such as, for example, diglycidyl ether of bisphenol A, diglycidyl ether of bisphenol F, diglycidyl ether of resorcin, polyglycidyl ethers of phenol novolaks, polyglycidyl ethers of cresol novolaks, diglycidyl esters of phthalic acid, and the like. Also suitable are the polyglycidyl ethers of the polyalkylene oxides of the foregoing aromatic polyglycidyl ethers and esters.

The epoxy crosslinking agent preferably has an epoxide equivalent weight of from about 90 to about 6000, more preferably from about 180 to about 800, and especially from about 180 to about 300.

In a preferred embodiment, the epoxy crosslinking agent is encapsulated in a microencapsulation compound which remains as an intact shell around the active epoxy crosslinking agent during typical hot melt application conditions, i.e., from about 60° C. to about 140° C., and which melts at an elevated curing temperature, for example, from about 120° C. to about 140° C., to release the epoxy crosslinking agent to effect crosslinking of the ethylene polymer component during a cure step subsequent to the hot melt application step. This is particularly advantageous when using high molecular weight ethylene copolymers, especially carboxylic acid functional high molecular weight copolymers, since these are generally more susceptible to viscosity increases in the hot melt reservoir wherein the hot melt formulation is maintained in a molten state prior to application. Microencapsulation is also generally desired if catalysts for acid-epoxy reactions are employed.

Suitable microencapsulation materials include, for example, high-melting microcrystalline waxes, high-melting melting natural waxes, non-reactive polyolefin materials and the like. Such materials are available, for example, under the trade designations POLYWAX 2000, MPP635, ACROWAX C, VESTOWAX A616, and the like, which have a melting point in the range of about 120° C. to about 140° C., and a relatively narrow melting range, e.g. 2°-5° C.

Microencapsulation is well known in the art, and the epoxy crosslinking agent may be encapsulated, for example, in a centrifugal extrusion device wherein the epoxy crosslinking agent and the shell material flow through concentric tubes to nozzles mounted on an outer edge of the device. The liquid epoxy crosslinking agent, surrounded by the molten shell material, is impelled outward by centrifugal force as the device spins, forming a fluid "rod" that separates into a stream of capsules while falling into a receptacle vessel. The action of surface tension leads the droplets naturally to assume spherical shape as the droplets are cooled in a manner well known in the microencapsulation arts. Discrete, non-sticky and free-flowing microcapsules of from about 200 $\mu$m to about 500 $\mu$m average diameter are typical with a usual payload (weight percentage encapsulated material) of from about 50 to about 80 percent. The dicarboxylic anhydride employed with the hydroxyl functional polymer is microencapsulated in a similar fashion.

When the epoxy crosslinking agent is used in an unencapsulated form, the crosslinking agent should be essentially free from pendant functional groups which are reactive with the ethylene polymer component, such as, for example, hydroxyl groups. The presence of substantial hydroxyl groups in the epoxy crosslinking agent can lead to undesired and premature reaction between the hydroxyl groups of the epoxy crosslinking agent and the acid groups of the ethylene polymer component.

The epoxy crosslinking agent is generally present in an amount effective for crosslinking the ethylene polymer component. Preferably, the epoxy crosslinking agent is present in the hot melt in an amount providing an equivalent ratio of epoxide groups in the crosslinking agent to acid groups (from copolymerized acid or from conversion of hydroxyl functionality with an acid anhydride to carboxylic acid functionality) in the ethylene polymer component of from about 0.1:1 to about 10:1, more preferably from about 0.5:1 to about 2.5:1 and particularly from about 0.9:1 to about 1.5:1. If an insufficient amount of the epoxy crosslinking agent is employed, there may be too little crosslinking effected to achieve the benefits of the present invention, and a number of pendant acid groups in the ethylene polymer component may remain unreacted. On the other hand, if too much epoxy crosslinking agent is employed, insufficient crosslinking might be obtained since the acid groups in the ethylene polymer component may be reacted with only one end of an epoxy crosslinking molecule.

In general, approximately stoichiometric equivalents of pendant carboxylic acid groups and epoxy groups are suitable. In a preferred embodiment, however, an excess stoichiometric amount of epoxy crosslinking agent and the dicarboxylic anhydride is used with the ethylene-alcohol copolymer. The crosslinking reaction between the ethylene-alcohol copolymer, anhydride and epoxy during cure results in a formation or regeneration of a hydroxyl group by each epoxide group. The excess anhydride in this embodiment can react with the regenerated hydroxyl groups to form or regenerate another acid group which in turn can react with another epoxide group in further crosslinking to increase the crosslink density and improve the high temperature shear strength of the adhesive.

A crosslinking catalyst may be used in the hot melt formulation, if desired, to accelerate and improve curing and has been found to be especially advantageous in the case of low viscosity copolymers. Such catalysts are well known in the art and are generally used in an amount of from about 0.05 to about 2 percent by weight of the hot melt formulation, preferably from about 0.1 to about 1 weight percent. The catalyst is preferably a tertiary amine. Suitable representative tertiary amine catalysts include, for example, dimethyl lauryl amine, N-butylmorpholine, N-dimethylcyclohexylamine, benzyldimethylamine, pyridine, 4-dimethylaminopyridine, 1-methylimidazole, tetramethylethylenediamine, tetramethylguanidine, triethylenediamine, tetramethyl hydrazine, N,N-dimethylpiperazine, N,N,N',N'-tetramethyl-1,6-hexanediamine, and the like. Basic compounds may also be used, such as, for example, sodium hydroxide, as well as metal chelates, onium catalysts, triphenyl stibine, triphenyl phosphine, and the like. When a catalyst is present in the hot melt, the epoxy crosslinking agent and any anhydride should be encapsulated to extend pot life and avoid premature curing.

The hot melt adhesive composition may further contain relatively minor amounts of ingredients such as waxes, oils, fillers, coupling agents, colorants, antioxidants, and other stabilizing additives which do not substantially adversely affect the system such as, for example, by adversely interfering with the epoxy crosslinking or adhesion of the hot melt to a substrate surface. The formulation is preferably essentially free of solvents and other vaporizable constituents which detract from the hot melt characteristics of the formulation, e.g. quick setting, instantaneous bonding, no need for drying or solvent removal, etc.

The antioxidant or stabilizer can be added to the hot melt at from about 0.1 to about 1.5 percent by weight, and preferably from about 0.1 to about 1 percent by weight, and typically about 0.5 weight percent.

The optional wax component is typically derived from refined fractions of crude oil, and therefore, consists essentially of paraffinic hydrocarbons which contain significant amounts of branched chain and cycloparaffin as well as aromatics. This composition of components is characterized by exhibiting the formation of only small crystalline regions in the solid wax so that these waxes, as compared to paraffin waxes with fewer branch and cyclic groups, are generally softer and more flexible than an otherwise comparable paraffin wax having a similar melting point or range. Microcrystalline waxes are well known in the art and are readily available commercially under trade designations including SHELL WAX 905, MICROHEX R, VICTORY, ESCOMER H-101, MOORE and MUNGER'S PARAFLINT H-1, and the like.

The optional oils which may be mentioned include refined hydrocarbon oils such as are commonly used in adhesives, including paraffinic, aromatic, and naphthenic oils available under the trade designations KAYDOL, TUFFLO, and the like. The refined oils serve to reduce viscosity and improve surface tack properties.

Particulated fillers which may be used for thickening and price reduction include glass, silica, amorphous $SiO_2$, fumed alumina, calcium carbonate, fibers and the like, generally comprising from about 1 to about 50 percent by weight of the hot melt formulations, preferably from about 2 to about 40 percent by weight. Silicates are generally used at from 2 to 10 weight percent while calcium carbonate can comprise up to 30 or 40 weight percent of the adhesive. Suitable commercially available fillers are available under the trade designations CAB-O-SIL, ZEOSIL 35, AEROSIL R972, DUCRAL 10 and the like.

Suitable coupling agents include (but are not limited to) organometallic compounds such as, for example, silane-based compounds, organotitanates, organozirconates, organozircoaluminates, chrome complexes and the like. Typical concentrations are from about 0.3 to about 1.2 percent by weight of the adhesive formulation. These are generally selected to promote adhesion based on the substrates and/or fillers involved in the particular application.

The curable hot melt adhesive compositions of this invention are prepared by blending together the components in the melt until a homogeneous blend is obtained. Various methods of blending materials of this type are known to the art, and any method that produces a homogeneous blend is satisfactory. Typical blending equipment includes, for example, mixing extruders, roll mills, Banbury mixers, Brabenders, and the like. In general, the blend components blend easily in the melt and a heated vessel equipped with a stirrer is all that is required. For example, a Cowl's stirrer provides an effective mixing means for preparing these hot melt adhesive compositions. The components are added in no particular order, but generally, the tackifying resin is added first and heated in the vessel until molten. Thereafter, the ethylene polymer component, i.e. the ethylene-acid copolymer or the ethylene-alcohol copolymer, are placed in the vessel and heated and mixed. Then the wax, oil, or other optional ingredients are added. In general, the epoxy crosslinking agent and any anhydride, either or both of which may be encapsulated, are added to the mixture last.

The hot melt adhesive may be cooled and later reheated for use, or used directly from the hot melt placed in a reservoir and supplied to a substrate using conventional equipment, for example, for pumping or pressure extrusion through slot dies. An important feature of the present invention is that the hot melt formulation has a good melt pot stability so that appreciable premature curing of the formulation is not usually encountered at typical hot melt conditions, such as, for example, from about 60° C. to about 140° C., generally on the order of several hours or more. Generally, the hot melt is heated sufficiently for a target viscosity of about 100,000 cps, although a viscosity as high as 150,000 cps can usually be tolerated. For suitable pot stability, the viscosity of the hot melt should not increase more than 20 percent when maintained at the pot temperature for a period of 8 hours.

Suitable substrates include, for example, plastics, metals, wood, glass, paper and the like. After the hot melt is applied to a first substrate surface, a second substrate surface may be placed opposite the first surface in contact with the adhesive to form a laminate or composite structure. The adhesive remains tacky while molten, and cools forming an adhesive bond to the substrate(s), although cooling before curing is not necessary.

Crosslinking is generally effected by reaction between the carboxylic acid groups in the ethylene polymer component and the crosslinking agent. The carboxylic acid groups are pendant on the ethylene-acid copolymers, but are formed in the case of the ethylene-alcohol copolymers by intermediate reaction between hydroxyl groups in the copolymer and the anhydride. When the intermediate hydroxyl anhydride reaction pathway is employed, the anhydride reacts to form an ester with the hydroxyl group and a terminal acid group for reaction with an epoxide moiety, effectively converting the hydroxyl functionality to carboxylic acid functionality. In any case, the formation of low molecular weight byproducts is avoided during the heat curing step. This has the advantage of enhancing adhesion to the substrate surface and not contributing to the leaching of contaminants in bathing and cleaning solutions which are sometimes used with adhesively coated or joined composites and laminates.

The hot melt adhesive is cured by exposing it to heat for a period of time effective to introduce the carboxylic acid functionality to the ethylene polymer by reaction between the hydroxyl functionality and the anhydride, if necessary, and to crosslink the carboxylic acid groups of the ethylene polymer component with the epoxy groups of the crosslinking agent. The suitable temperatures are preferably above about 150° C. for from about 10 minutes to about 2 hours or more. In general, the higher the temperature, the more rapid the cure, but excessively high temperatures, e.g. above about 200° C. which can degrade the adhesive components, are to be avoided. Where the adhesive includes encapsulated epoxy and/or anhydride, the temperature should also be suitable to disencapsulate or release the encapsulated material(s) for example, by melting the encapsulating or shell material, although other means of disencapsulation may also be used, such as, for example, pressure, shear, sonication and the like. Temperatures of 170° C. for 1 hour, or 180° C. for one-half hour, are exemplary curing conditions.

The invention is illustrated by way of the Examples below.

EXAMPLE 1

A curable hot melt was made by blending ethylenemethyl acrylate-acrylic acid terpolymer (EMAAA) with a tackifier and a diepoxy. The EMAAA terpolymer had a melt index of 16 dg/min, a methyl acrylate content of 20 weight percent and an acrylic acid content of 7 weight percent. The EMAAA terpolymer had a glass transition temperature ($T_g$) of −34° C. and a melting temperature ($T_m$) of 65° C. as determined by differential scanning calorimetry (DSC). The tackifier was FORAL 105 and was used at a weight ratio of EMAAA terpolymer to resin of 40:60. The diepoxy employed was EPON 828 obtained from Shell Chemical Company and had an epoxide equivalent weight of 189, a number average molecular weight of 369 and a ratio of weight average to number average molecular weight ($M_w/M_n$) of 1.10. The diepoxy was used in a stoichiometric amount with respect to the acid in the EMAAA terpolymer. The blend was prepared by mixing the EMAAA and the tackifier under an inert gas blanket in a stirrer-equipped vessel heated to a temperature of 150°-200° C. until homogeneous. The mixture was cooled to 120° C. and the epoxy material was added and mixed for 5–10 minutes. The blend was then deposited on release paper or Teflon-coated aluminum foil, or placed in a Teflon-coated mold for cooling to ambient temperature. For lap shear testing, the solid blend was pressed in a mold at 100° C. for 5–10 seconds to form a sheet upon cooling. The sheet was then cut into 1-inch by 1-inch squares and clamped between untreated galvanized steel retangular coupons (4"×1"×0.06") using 8 mil wires as spacers. The clamped coupons were cured in an oven at 170° C. for one hour. The infrared spectrum of the cured hot melt compositions showed disappearance of the band at 915 cm$^{-1}$, indicating the ring opening of the epoxy group. Lap shear was determined in accordance with ASTM D-1002-72 modified for a 1-inch overlap and a separation speed of 0.2 in./min. Room temperature lap shear of the cured hot melt adhesive with galvanized steel was 1400 psi. lap shear results at temperatures of 27°-90° C., and lap shear results for the specimens aged in 5% NaCl at 35° C. for 1-3 weeks, are presented in Table I.

TABLE I

| SINGLE LAP SHEAR, GALVANIZED STEEL, EMAAA/FORAL 105/EPON 828 | | | |
|---|---|---|---|
| TEST TEMPERA- TURE (°C.) | AGING IN 5% NaCl (WEEKS) | LAP SHEAR (PSI/MPa) | FAILURE LOCUS[1] |
| 27 | — | 1400/9.7 | Cohesive |
| 40 | — | 540/3.7 | Cohesive |
| 50 | — | 400/2.8 | Cohesive |
| 60 | — | 180/1.2 | Cohesive |
| 70 | — | 110/0.76 | Cohesive |
| 80 | — | 78/0.54 | Cohesive |
| 90 | — | 32/0.22 | Cohesive |
| 27 | 1 | 1160/8.0 | Cohesive |
| 27 | 2 | 1090/7.5 | Cohesive |
| 28 | 3 | 770/5.3 | Adhesive/ Cohesive |

Note for Table I:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

Figure 1:
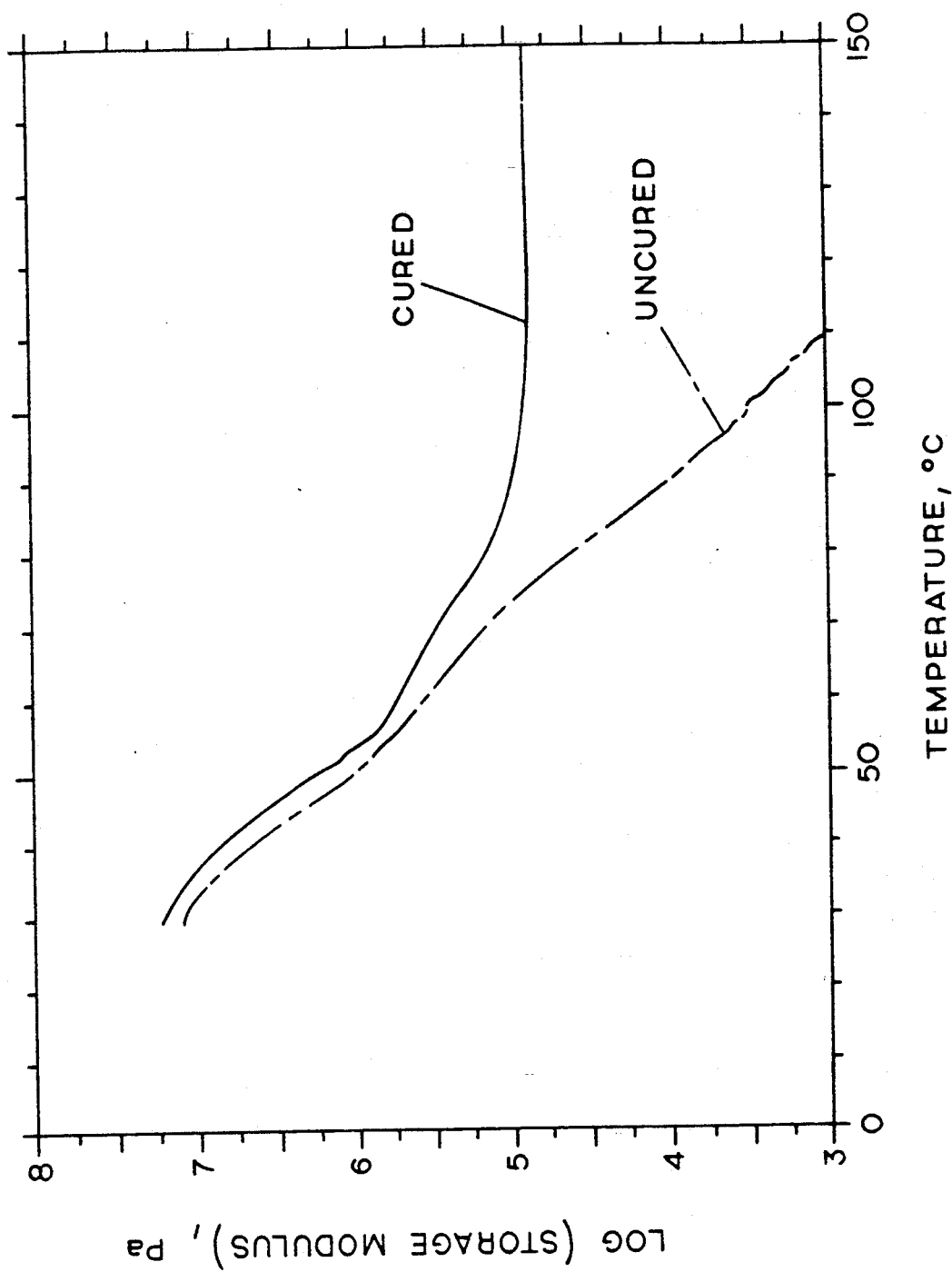
FIG. 1 illustrates a graph of the storage modulus versus temperature for an epoxy-cured EMAAA hot melt adhesive (x—x) according to the present invention in comparison with the same uncured adhesive (o—o) as described below, in Example 1.

The epoxy reaction was also confirmed in the cured hot melt adhesives by evaluation using a Polymer Laboratories, Inc. dynamic mechanical thermal analyzer (DMTA). The adhesive was cured at 170° C. for one hour in a 2 mm deep Teflon-coated mold, and 12 mm diameter disks were die cut for DMTA testing. The DMTA was operated at 1 Hz with a displacement of 64 μm and a heating rate of 4° C./min. The storage modulus (G') was determined according to the DMTA manufacturer's procedures. G' is understood in the art to be a measurement of the elastic or storage modulus (stress/strain) measured in phase with the sinusoidal shear displacement of the material, as opposed to the viscous modulus or loss modulus measured out of phase with the displacement. The results are illustrated graphically in FIG. 1. From the data it is seen that the storage modulus for the cured material is similar to the uncured material at low temperatures, but is significantly improved above 70° or 80° C.

EXAMPLE 1

The procedure of Example 1 is followed except that the EPON 828 is microencapsulated with a wax melting at about 140° C. The viscosity of the uncured hot melt at 135° C. is about 110,000 cps, and increases only negligibly after an 8-hour period at this temperature, in contrast to the Example 1 material which had a 20% viscosity increase from the initial 110,000 cps at 135° C., observed at about 5 minutes. The properties of the cured materials (Example 1A vs. Example 1) are comparable.

EXAMPLE 2

The procedure of Example 1 was repeated with an adhesive mixture containing 20 g of ethylene-acrylic acid copolymer (15 wt. % acrylic acid, MI 40, DSC $T_g$ −30° C., DSC $T_m$ 90° C.); 30 g of FORAL 105 tackifier; and 7.7 g EPON 828 epoxy resin. Curing was done at 180° C. for one-half hour. The lap shear results are presented in Table II.

TABLE II

SINGLE LAP SHEAR, GALVANIZED STEEL, EAA (15% AA)/FORAL 105/EPON 828

| TEST TEMPERATURE (°C.) | AGING IN 5% NaCl (WEEKS) | LAP SHEAR (PSI/MPa) | FAILURE LOCUS[1] |
|---|---|---|---|
| 27 | — | 1900/13.1 | Cohesive |
| 40 | — | 1000/6.9 | Cohesive |
| 50 | — | 730/5.0 | Cohesive |
| 60 | — | 160/1.1 | Cohesive |
| 70 | — | 130/0.90 | Cohesive |
| 80 | — | 70/0.48 | Cohesive |
| 90 | — | 50/0.34 | Cohesive |
| 27 | 1 | 1513/10.4 | Cohesive |
| 27 | 2 | 1079/7.4 | Cohesive |
| 27 | 3 | 920/6.3 | Adhesive/Cohesive |

Note for Table II:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

EXAMPLE 3

The procedure of Example 2 was repeated with an adhesive mixture containing 20 g of ethylene-acrylic acid copolymer (20 wt. % acrylic acid, MI 300, DSC $T_g$ 25° C., DSC $T_m$ 80°); 30 g of FORAL 105 tackifier; and 10.25 g EPON 828 epoxy resin. The result are presented in Table III.

TABLE III

SINGLE LAP SHEAR, GALVANIZED STEEL, EAA (20% AA)/FORAL 105/EPON 828

| TEST TEMPERATURE (°C.) | AGING IN 5% NaCl (WEEKS) | LAP SHEAR (PSI/MPa) | FAILURE LOCUS[1] |
|---|---|---|---|
| 27 | — | 1405/9.7 | Cohesive |
| 40 | — | 471/3.2 | Cohesive |
| 60 | — | 225/1.6 | Cohesive |
| 80 | — | 66/0.46 | Cohesive |
| 27 | 1 | 1204/8.3 | Cohesive |
| 27 | 2 | 660/4.6 | Cohesive |
| 27 | 3 | 611/4.2 | Adhesive/Cohesive |

Note for Table III:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

EXAMPLE 4

Figure 2:
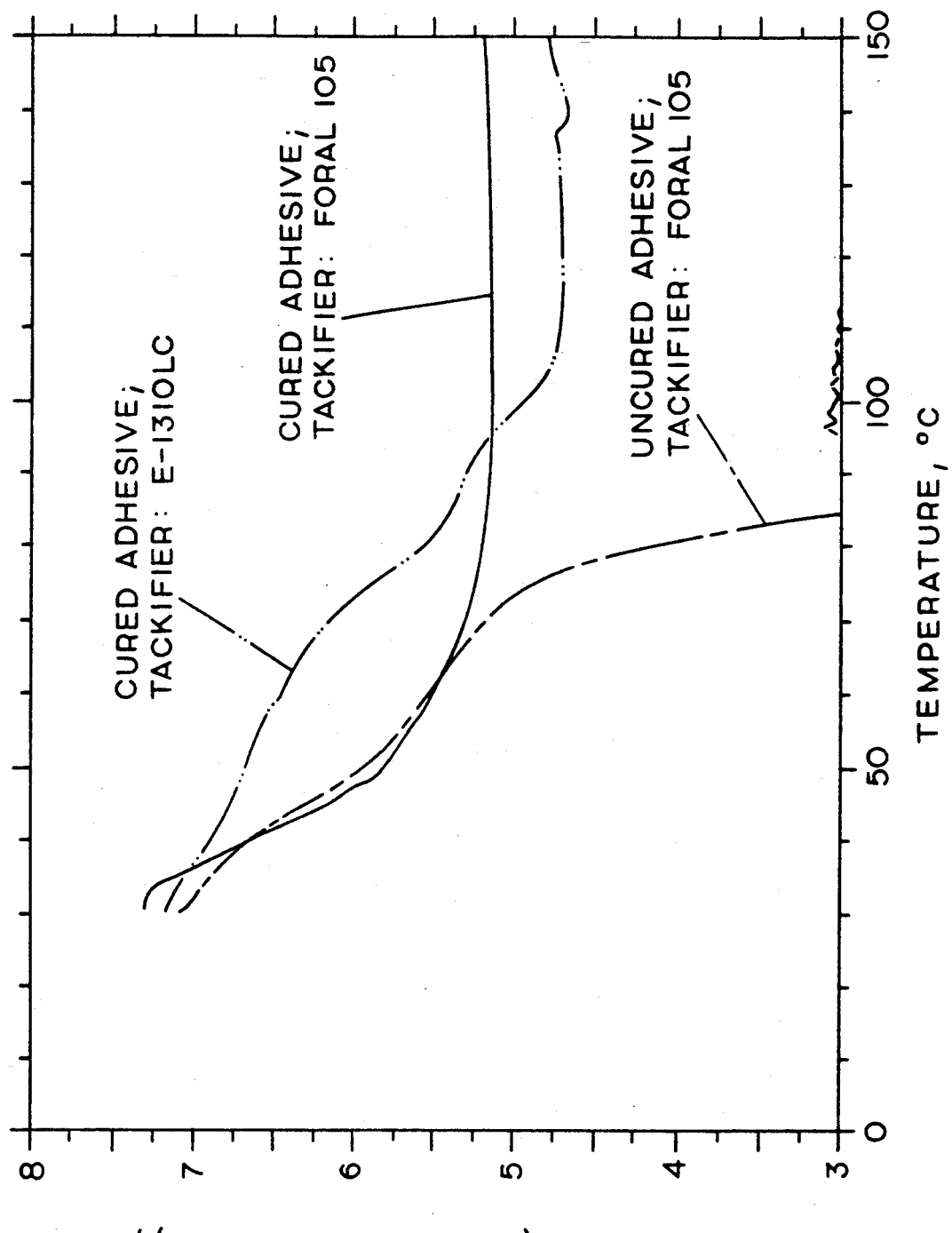
FIG. 2 illustrates a graph of the storage modulus versus temperature for epoxy-cured EVAVOH/MAH hot melt adhesive systems containing FORAL 105 tackifier (o—o) and E-131OLC tackifier (+—+) in comparison with the uncured adhesive containing FORAL 105 tackifier (x—x) as described below in Examples 4 and 6.

The procedure of Example 2 was repeated with an adhesive mixture containing 20 g of partially hydrolyzed ethylene-vinyl acetate copolymer (13.7 wt. % vinyl alcohol, 4.0 wt. % vinyl acetate, MI 2500, DSC $T_g$ −22° C., DSC $T_m$ 91° C.); 30 g of FORAL 105 tackifier; 11.5 g EPON 828 epoxy resin; and 5.7 g maleic anhydride. The maleic anhydride was added after the epoxy resin at 120° C. during the blending procedure. The storage modulus data is presented in FIG. 2, and the lap shear results are presented in Table IV.

TABLE IV

SINGLE LAP SHEAR, GALVANIZED STEEL, EAVAVOH/FORAL 105/EPON 828/MAH

| TEST TEMPERATURE (°C.) | AGING IN 5% NaCl (WEEKS) | LAP SHEAR (PSI/MPa) | FAILURE LOCUS[1] |
|---|---|---|---|
| 27 | — | 2500/17.2 | Cohesive |
| 40 | — | 500/3.4 | Cohesive |
| 50 | — | 320/2.2 | Cohesive |
| 60 | — | 240/1.7 | Cohesive |
| 70 | — | 160/1.1 | Cohesive |
| 80 | — | 100/0.69 | Cohesive |
| 90 | — | 1070/0.48 | Cohesive |
| 27 | 1 | 1520/10.5 | Cohesive |
| 27 | 2 | 601/4.1 | Cohesive |
| 27 | 3 | 372/2.6 | Adhesive/Cohesive |

Note for Table IV:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

EXAMPLE 5

The procedure of Example 4 was repeated with an adhesive mixture containing 20 g of partially hydrolyzed ethylene-vinyl acetate copolymer (13.7 wt. % vinyl alcohol, 4.0 wt. % vinyl acetate, MI 2500, DSC $T_g$−22° C., DSC $T_m$ 91° C.); 30 g FORAL 105 tackifier; 11.5 g EPON 828 epoxy; and 9.5 g phthalic anhydride. The phthalic anhydride was added after the epoxy resin during the blending procedure. The results are presented in Table V.

TABLE V

SINGLE LAP SHEAR, GALVANIZED STEEL, EVAVOH/FORAL 105/EPON 828/PAH

| TEST TEMPERATURE (°C.) | AGING IN 5% NaCl (WEEKS) | LAP SHEAR (PSI/MPa) | FAILURE LOCUS[1] |
|---|---|---|---|
| 27 | — | 2468/17.0 | Cohesive |
| 40 | — | >1000/>6.9 | Cohesive |
| 50 | — | >1000/>6.9 | Cohesive |
| 70 | — | 187/1.3 | Cohesive |
| 80 | — | 120/0.83 | Cohesive |
| 27 | 1 | 2240/15.4 | Cohesive |
| 27 | 2 | 2135/14.7 | Cohesive |
| 27 | 3 | 956/6.6 | Adhesive/Cohesive |

Note for Table V:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

The uncured adhesive mixture had an observed viscosity of about 86,000 cps at 90° C. which increased about 12.2% to just 96,500 cps after 6.5 hours at this temperature.

EXAMPLE 6

The procedure of Example 5 was repeated with an adhesive mixture containing 20 g of partially hydrolyzed ethylene-vinyl acetate copolymer (13.7 wt. % vinyl alcohol, 4.0 wt. % vinyl acetate, MI 2500, DSC $T_g$ −22° C., DSC $T_m$ 91° C.); 30 g ESCOREZ 1310LC aliphatic tackifier; 11.5 g EPON 828 epoxy resin; and 3.8 g maleic anhydride. Since the ESCOREZ 1310LC tackifier was not as compatible as the FORAL 105 tackifier used in Example 4, the performance was not as good. The storage modulus data are presented in FIG. 2, and the lap shear results are presented in Table VI.

TABLE VI

SINGLE LAP SHEAR, GALVANIZED STEEL, EVAVOH/ESCOREZ 1310LC/EPON 828/MAH

| TEST TEMPERATURE (°C.) | AGING IN 5% NaCl (WEEKS) | LAP SHEAR (PSI/MPa) | FAILURE LOCUS[1] |
|---|---|---|---|
| 27 | — | 606/4.2 | Cohesive |
| 60 | — | 197/1.4 | Cohesive |
| 80 | — | 79/0.54 | Cohesive |

Note for Table VI:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

EXAMPLE 7

The procedure of Example 5 was repeated using an adhesive mixture containing 20 g of partially hydrolyzed ethylene-vinyl acetate copolymer (13.7 wt. % vinyl alcohol, 4.0 wt. % vinyl acetate, MI 2500, DSC $T_g$ −22° C., DSC $T_m$ 91° C.); 30 g of FORAL 105 tackifier; 33.5 g of EPON 1001 F epoxy ($M_n$=2739, $M_w$=3828, $M_w/M_n$=1.40, EEW=538); and 9.2 g phthalic anhydride. The results are presented in Table VII below.

TABLE VII

SINGLE LAP SHEAR, GALVANIZED STEEL, EVAVOH/FORAL 105/EPON 1001F/PAH

| TEST TEMPERATURE (°C.) | AGING IN 5% NaCl (WEEKS) | LAP SHEAR (PSI/MPa) | FAILURE LOCUS[1] |
|---|---|---|---|
| 27 | — | 1016/7.0 | Cohesive |
| 40 | — | 413/2.8 | Cohesive |
| 60 | — | 116/0.80 | Cohesive |
| 80 | — | 47/0.32 | Cohesive |
| 27 | 1 | 874/6.0 | Cohesive |
| 27 | 2 | 452/3.1 | Cohesive |
| 27 | 3 | 264/1.8 | Adhesive/Cohesive |

Note for Table VII:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

EXAMPLE 8

The procedure of Example 5 was repeated with an adhesive mixture containing 20 g of partially hydrolyzed ethylene-vinyl acetate copolymer (13.7 wt. % vinyl alcohol, 4.0 wt. % vinyl acetate, MI 2500, DSC $T_g$ −22° C., DSC $T_m$ 91° C.); 30 g FORAL 105 tackifier; 14.9 g of DER 337 epoxy resin (obtained from DOW Chemical, $M_n$=1481, $M_w$=1694, $M_w/M_n$=1.14, EEW=240); and 9.2 g phthalic anhydride. The results are presented in Table VIII.

TABLE VIII

SINGLE LAP SHEAR, GALVANIZED STEEL, EVAVOH/FORAL 105/DER 337/PAH

| TEST TEMPERATURE (°C.) | AGING IN 5% NaCl (WEEKS) | LAP SHEAR (PSI/MPa) | FAILURE LOCUS[1] |
|---|---|---|---|
| 27 | — | 1968/13.6 | Cohesive |
| 40 | — | 1130/7.8 | Cohesive |
| 60 | — | 335/2.3 | Cohesive |
| 80 | — | 136/0.94 | Cohesive |
| 27 | 1 | 1755/12.1 | Cohesive |
| 27 | 2 | 1629/11.2 | Cohesive |
| 27 | 3 | 1273/8.8 | Adhesive/Cohesive |

Note for Table VIII:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

EXAMPLE 9

The procedure of Example 5 was repeated with an adhesive mixture containing 30 g of partially hydrolyzed ethylene-vinyl acetate copolymer (13.7 wt. % vinyl alcohol, 4.0 wt. % vinyl acetate, MI 2500, DSC $T_g$ −22° C., DSC $T_m$ 91° C.); 20 g FORAL 105 tackifier; 17.2 g of EPON 828 epoxy resin and 14.2 g of phthalic anhydride. The results are presented in Table IX.

TABLE IX

SINGLE LAP SHEAR, GALVANIZED STEEL, EVAVOH/FORAL 105/EPON 828/PAH

| TEST TEMPERATURE (°C.) | AGING IN 5% NaCl (WEEKS) | LAP SHEAR (PSI/MPa) | FAILURE LOCUS[1] |
|---|---|---|---|
| 27 | — | 920/6.3 | Cohesive |
| 40 | — | 598/4.1 | Cohesive |
| 60 | — | 146/1.0 | Cohesive |
| 80 | — | 51/0.35 | Cohesive |
| 27 | 1 | 801/5.5 | Cohesive |
| 27 | 2 | 454/3.1 | Cohesive |
| 27 | 3 | 279/1.9 | Adhesive/Cohesive |

Note for Table IX:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

EXAMPLE 10

The procedure of Example 5 was repeated with an adhesive mixture containing excess epoxy and anhydride to enhance the crosslink density of the network and improve the high temperature shear strength of the adhesive. The mixture containing 20 g of partially hydrolyzed ethylene-vinyl acetate copolymer (13.7 wt. % vinyl alcohol, 4.0 wt. % vinyl acetate, MI 2500, DSC $T_g$ −22° C., DSC $T_m$ 91° C.); 30 g FORAL 105 tackifier; 13.8 g EPON 828 epoxy; and 12.8 g phthalic anhydride. The results are presented in Table X.

TABLE X

SINGLE LAP SHEAR, GALVANIZED STEEL, EVAVOH/FORAL 105/EPON 828/PAH

| TEST TEMPERATURE (°C.) | AGING IN 5% NaCl (WEEKS) | LAP SHEAR (PSI/MPa) | FAILURE LOCUS[1] |
|---|---|---|---|
| 27 | — | 2270/15.7 | Cohesive |
| 40 | — | 1610/11.1 | Cohesive |
| 60 | — | 501/3.5 | Cohesive |
| 80 | — | 173/1.2 | Cohesive |
| 27 | 1 | 2205/15.2 | Cohesive |
| 27 | 2 | 1341/9.2 | Cohesive |
| 27 | 3 | 1208/8.3 | Adhesive/ |

TABLE X-continued

SINGLE LAP SHEAR, GALVANIZED STEEL,
EVAVOH/FORAL 105/EPON 828/PAH

| TEST TEMPERATURE (°C.) | AGING IN 5% NaCl (WEEKS) | LAP SHEAR (PSI/MPa) | FAILURE LOCUS[1] |
|---|---|---|---|
| | | | Cohesive |

Note for Table X:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

EXAMPLE 11

The procedure of Example 2 was repeated with an adhesive mixture containing a blend of an ethylene copolymer with high MI and high carboxylic acid content and another ethylene copolymer with low MI and low carboxylic acid content to form a non-uniform crosslinked network and improve high temperature shear strength of the adhesive. The mixture contained 16 g of ethylene-acrylic acid copolymer (20 wt. % acrylic acid, MI 300, DSC $T_g$ 25° C., DSC $T_m$ 80° C.); 4 g of PRIMACOR 3440 ethylene-acrylic acid copolymer (obtained from the Dow Chemical Company, 9 wt. % acrylic acid, MI 10 (at 230° C.), DSC $T_g$ −17° C., DSC $T_m$ 96° C.); 30 g of FORAL 105 tackifier; and 9.12 g of EPON 828 epoxy resin. The results are presented in Table XI.

TABLE XI

SINGLE LAP SHEAR, GALVANIZED STEEL,
EAA (9% AA)/EAA (20% AA)/FORAL 105/EPON 828

| TEST TEMPERATURE (°C.) | AGING IN 5% NaCl (WEEKS) | LAP SHEAR (PSI/MPa) | FAILURE LOCUS[1] |
|---|---|---|---|
| 27 | — | 1699/11.7 | Cohesive |
| 40 | — | 1399/9.6 | Cohesive |
| 60 | — | 357/2.5 | Cohesive |
| 80 | — | 83/0.57 | Cohesive |
| 27 | 1 | 1813/12.5 | Cohesive |

Note for Table XI:
[1]Adhesive failure locus = specimen failed by clean separation from substrae; cohesive failure locus = specimen failed by leaving adhesive residue on both substrate surfaces; adhesive/cohesive = specimen failed partly adhesive, partly cohesive.

EXAMPLE 12

Figure 3:
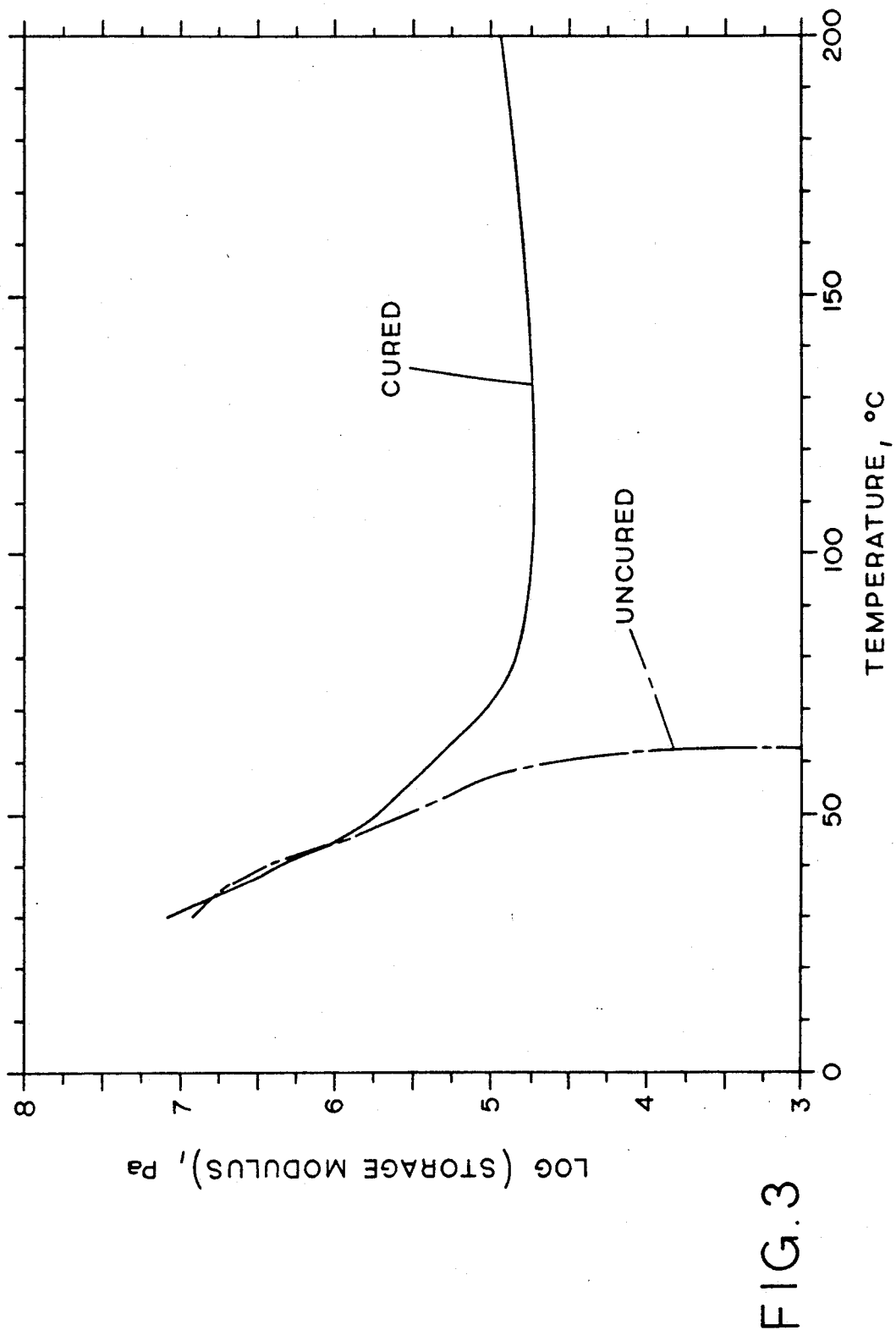
FIG. 3 illustrates a graph of the storage modulus versus temperature for an epoxy-cured EVAAA hot melt adhesive containing FORAL 105 tackifier (o—o) in comparison with the same uncured material (+—+) as described below in Example 12.

The procedure of Example 4 was repeated with an adhesive mixture containing 20 g of ethylene-vinyl acetate-acrylic acid terpolymer (9.3 wt. % acrylic acid, 12.1 wt % vinyl acetate, 190° C. Brookfield viscosity 3050 cps, DSC $T_g$ −23° C., DSC $T_m$ 70° C.); 30 g of FORAL 105 tackifier; and 4.8 g of EPON 828 epoxy resin. The crosslinking reaction was confirmed by running the cured and uncured compositions on a dynamic mechanical thermal analyzer as described in Example 1. The retention of the storage modulus (G') of the cured material up to 200° C. compared to the uncured material is illustrated in FIG. 3.

EXAMPLE 13

Figure 4:
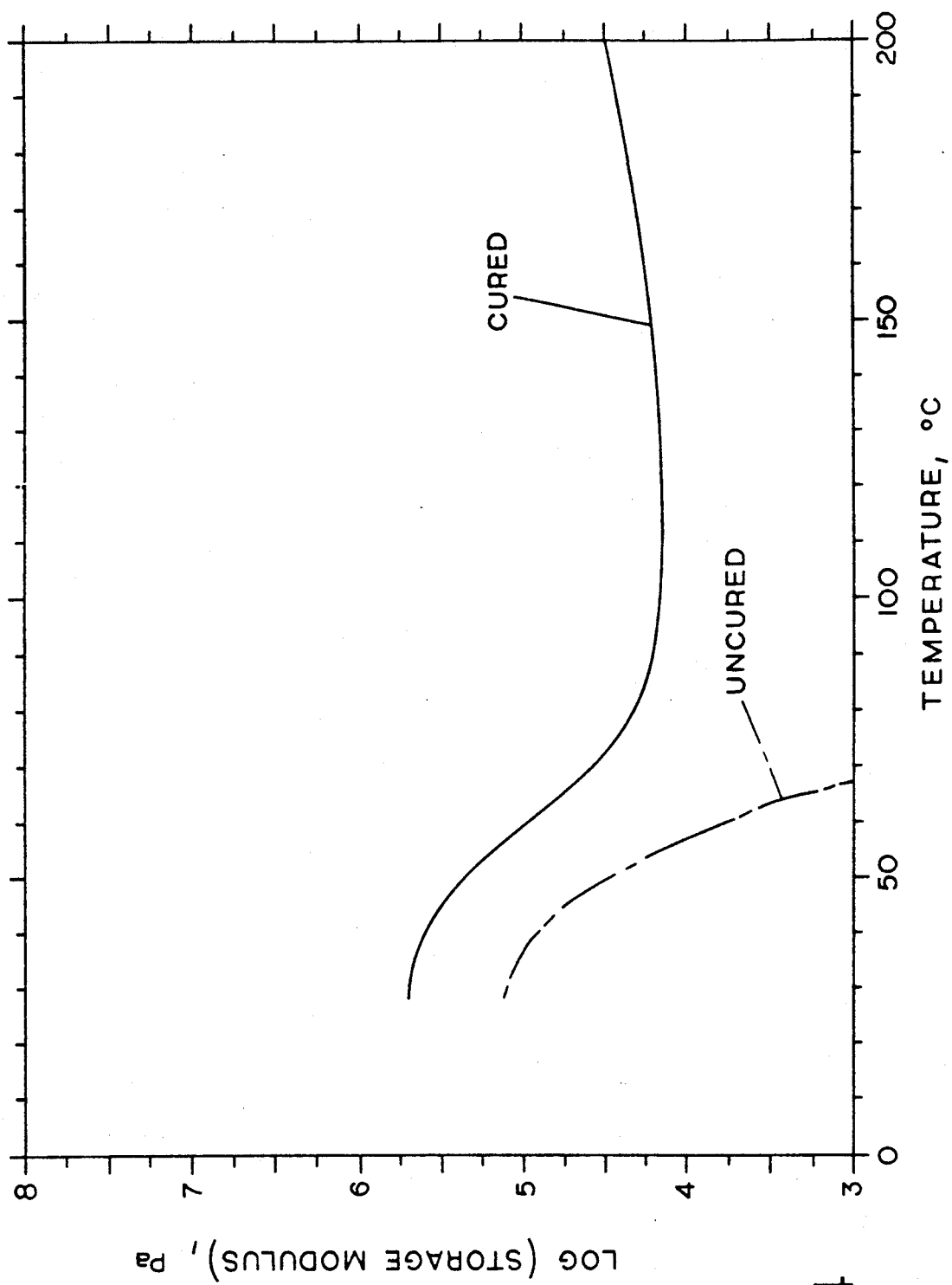
FIG. 4 illustrates a graph of the storage modulus versus temperature for an epoxy-cured EVAAA hot melt adhesive containing no tackifier (o—o) in comparison with the same uncured material (+—+) as described below in Example 13.

The procedure of Example 12 was repeated with an adhesive mixture containing 50 g of ethylene-vinyl acetate-acrylic acid terpolymer (14.8 wt. % acrylic acid, 4.9 wt. % vinyl acetate, 190° C. Brookfield viscosity 150 cps, DSC $T_g$ −12° C., DSC $T_m$ 49° C.); and 19 g of EPON 828 epoxy resin. The retention of the storage modulus (G') of the cured material up to 200° C. compared to the uncured material is illustrated in FIG. 4.

EXAMPLE 14

The procedure of Example 2 was repeated with an adhesive mixture containing 20 g of ethylene/2-hydroxyethyl methacrylate copolymer (GPC number average molecular weight 1000, 41.5 wt. % 2-hydroxyethyl methacrylalte, DSC $T_g$ −31° C., DSC $T_m$ 62° C.); 30 g of FORAL 105 tackifier; 12.0 g of EPON 828; and 7.0 g of pyromellitic dianhydride (PMDA). The pyromellitic dianhydride was added after the epoxy resin at 120° C. during the blending procedure. The lap shear results are presented in Table XII.

TABLE XII

Single Lap Shear, Galvanized Steel,
EHEMA (41.5% HEMA)/FORAL 105/EPON 828/PMDA
Composition of Example 14 Tested

| TEST TEMPERATURE (°C.) | AGING IN 5% NaCl (WEEKS) | LAP SHEAR (PSI/MPa) | FAILURE LOCUS |
|---|---|---|---|
| 27 | — | 2917/20.1 | cohesive |
| 40 | — | 2207/15.2 | cohesive |
| 60 | — | 1193/8.2 | cohesive |
| 80 | — | 618/4.3 | cohesive |
| 27 | 1 | 2232/15.4 | cohesive |
| 27 | 2 | 1852/12.8 | adhesive/cohesive |
| 27 | 3 | 1141/7.9 | adhesive |

Note for Table XII
1. Adhesive failure locus = specimen failed by clean separation from substrate;
2. Cohesive failure locus = specimen failed by leaving adhesive residue on both substrate surfaces;
3. Adhesive/cohesive failure locus = specimen failed partly adhesive, partly cohesive

EXAMPLE 15

The procedure of Example 2 was repeated with an adhesive mixture containing 20 g of ethylene/2-hydroxyethyl methacrylate copolymer (GP number average molecular weight 1000, 35.8 wt. % 2-hydroethyl methacrylate, DSC $T_g$ −32° C., DSC $T_g$ 76° C.); 30 g of FORAL 105 tackifier; 11.4 g of EPON 828; and 6.8 g of pyromellitic dianhydride (PMDA). The pyromellitic dianhydride was added after the epoxy resin at 120° C. during the blending procedure. The lap shear results are presented in Table XIII.

TABLE XIII

Single Lap Shear, Galvanized Steel,
EHEMA (35.8% HEMA)/FORAL 105/EPON 828/PMDA
Composition of Example 15 Tested

| TEST TEMPERATURE (°C.) | AGING IN 5% NaCl (WEEKS) | LAP SHEAR (PSI/MPa) | FAILURE LOCUS |
|---|---|---|---|
| −29 | — | 2051/14.1 | adhesive/cohesive |
| −10 | — | 2444/16.9 | cohesive |
| 10 | — | 3629/25.0 | cohesive |
| 27 | — | 2905/20.0 | cohesive |
| 40 | — | 2391/16.5 | cohesive |
| 60 | — | 1069/7.4 | cohesive |
| 80 | — | 562/3.9 | cohesive |
| 27 | 1 | 2635/18.2 | cohesive |
| 27 | 2 | 1807/12.5 | cohesive |
| 27 | 3 | 1709/11.8 | adhesive/cohesive |

Note for Table XIII
1. Adhesive failure locus = specimen failed by clean separation from substrate;
2. Cohesive failure locus = specimen failed by leaving adhesive residue on both substrate surfaces;
3. Adhesive/cohesive failure locus = specimen failed partly adhesive, partly cohesive The foregoing examples illustrate that the adhesive composition of the present invention can be applied as a hot melt and can be cured or crosslinked at elevated temperatures. In addition, the examples show the modulus properties and adhesion to galvanized steel of the cured adhesives.

The foregoing description of the invention is provided for illustrative purposes. Many variations and modifications of the invention will become apparent to those skilled in the art in view of the foregoing disclosure. It is intended that all such variations and modifications within the scope or spirit of the appended claims be embraced thereby.

I claim:

1. A heat-curable hot melt adhesive comprising a mixture of:
   (a) a copolymer of ethylene and an unsaturated alcohol selected from the group consisting of vinyl alcohols, hydroxyalkyl acrylates, and hydroxyalkyl methacrylates;
   (b) optionally, a tackifier;
   (c) an epoxy crosslinking agent having an average epoxide functionality of at least about 2; and
   (d) a dicarboxylic acid anhydride.

2. The adhesive of claim 1 wherein said copolymer contains in the range of from about 5 to about 30 weight percent of said unsaturated alcohol, based on the total weight of said formulation.

3. The adhesive of claim 1, wherein said copolymer further comprises a vinyl termonomer.

4. The adhesive of claim 1, wherein said copolymer further comprises up to about 20 weight percent of a vinyl termonomer selected from the group consisting of alkyl acrylates and methacrylates other than said hydroxyalkyl acrylates and hydroxyalkyl methacrylates and vinyl esters of carboxylic acids.

5. The adhesive of claim 1, wherein said copolymer comprises partially hydrolyzed ethylene-vinyl acetate copolymer.

6. The adhesive of claim 1, wherein the copolymer is a copolymer of ethylene and 2-hydroxy ethyl methacrylate.

7. The adhesive of claim 1, wherein the copolymer is a copolymer of ethylene and a vinyl alcohol.

* * * * *